United States Patent
Lin et al.

(10) Patent No.: US 9,819,652 B2
(45) Date of Patent: Nov. 14, 2017

(54) INFORMATION INTERACTION METHODS AND DEVICES

(71) Applicant: Xiaomi Inc., Beijing (CN)

(72) Inventors: Junqi Lin, Beijing (CN); Yang Zhang, Beijing (CN); Chenlei Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 38 days.

(21) Appl. No.: 14/847,978

(22) Filed: Sep. 8, 2015

(65) Prior Publication Data

US 2016/0094525 A1 Mar. 31, 2016

Related U.S. Application Data

(63) Continuation-in-part of application No. PCT/CN2015/071368, filed on Jan. 22, 2015.

(30) Foreign Application Priority Data

Sep. 25, 2014 (CN) .......................... 2014 1 0498743

(51) Int. Cl.
*H04L 29/06* (2006.01)
*H04W 12/06* (2009.01)
(Continued)

(52) U.S. Cl.
CPC ........ *H04L 63/0428* (2013.01); *H04L 63/061* (2013.01); *H04L 63/0853* (2013.01);
(Continued)

(58) Field of Classification Search
CPC ............... H04L 63/0428; H04L 63/061; H04L 63/0853; H04W 12/02; H04W 12/04; H04W 12/06; G06F 21/35; G06Q 20/32
See application file for complete search history.

(56) References Cited

U.S. PATENT DOCUMENTS 8,065,235 B2 * 11/2011 Narayanaswami .. G06Q 10/087
705/26.82
9,111,085 B1 * 8/2015 Darmour ................. G06F 21/32
(Continued)

FOREIGN PATENT DOCUMENTS

CN   101051904 A   10/2007
CN   101094054 A   12/2007
(Continued)

OTHER PUBLICATIONS

Maragoudakis, WIPO WO 2014/143916 A2, p. 1-104.*
Office Action (including English translation) issued in corresponding Chinese Patent Application No. 201410498743.6, dated Jun. 2, 2015, 20 pages.
International Search Report (including English translation) issued in corresponding International Application No. PCT/CN2015/071368, dated Jul. 1, 2015, 5 pages.
(Continued)

*Primary Examiner* — Beemnet Dada
*Assistant Examiner* — Stephen Gundry

(57) ABSTRACT

An information interaction method and device are provided. In the method, the device establishes a connection with a wearable device. The device sends information to be interacted corresponding to a logged-in ID to the wearable device via the connection. The device receives a first encrypted result returned by the wearable device. The device generates a first verifying factor corresponding to the first encrypted result with a predetermined algorithm. The device sends the information to be interacted and the first verifying factor in an associated manner to a server. The device receives a message indicating that an interaction is finished, where the message is sent if the server determines that a second verifying factor generated with the predetermined algorithm and corresponding to a second encrypted result matches the first verifying factor. The second encrypted result is obtained by encrypting the information by the server with the pre-stored encryption key.

14 Claims, 11 Drawing Sheets

(51) Int. Cl.
*H04W 12/02* (2009.01)
*H04W 12/04* (2009.01)
*G06Q 20/32* (2012.01)
*G06F 21/35* (2013.01)

(52) U.S. Cl.
CPC .......... *H04W 12/02* (2013.01); *H04W 12/04* (2013.01); *H04W 12/06* (2013.01); *G06F 21/35* (2013.01); *G06Q 20/32* (2013.01)

(56) References Cited

U.S. PATENT DOCUMENTS

| | | | | |
|---|---|---|---|---|
| 9,215,592 | B2* | 12/2015 | Narendra | H04W 12/06 |
| 9,292,992 | B2* | 3/2016 | Girard | G07F 7/1008 |
| 9,319,881 | B2* | 4/2016 | Narendra | H04W 12/06 |
| 9,544,770 | B2* | 1/2017 | Har | H04L 63/0869 |
| 9,754,097 | B2* | 9/2017 | Hessler | G06F 21/44 |
| 2002/0103765 | A1* | 8/2002 | Ohmori | G06Q 20/02 705/67 |
| 2004/0225613 | A1* | 11/2004 | Narayanaswami | G06Q 10/087 705/64 |
| 2005/0198510 | A1* | 9/2005 | Robert | G06F 21/10 713/175 |
| 2007/0150736 | A1 | 6/2007 | Cukier et al. | |
| 2008/0022089 | A1* | 1/2008 | Leedom | H04L 63/068 713/156 |
| 2008/0244699 | A1 | 10/2008 | Parhofer et al. | |
| 2009/0068982 | A1* | 3/2009 | Chen | G06Q 20/108 455/407 |
| 2012/0023026 | A1 | 1/2012 | Chen et al. | |
| 2013/0268767 | A1* | 10/2013 | Schrecker | G06F 21/31 713/185 |
| 2014/0094141 | A1* | 4/2014 | Wan | H04W 12/02 455/410 |
| 2014/0263648 | A1* | 9/2014 | Van Bosch | G06K 7/087 235/450 |
| 2014/0266596 | A1* | 9/2014 | Narendra | G05B 1/03 340/5.81 |
| 2014/0266597 | A1* | 9/2014 | Narendra | G05B 1/03 340/5.81 |
| 2014/0266598 | A1* | 9/2014 | Narendra | G05B 1/03 340/5.81 |
| 2014/0266599 | A1* | 9/2014 | Narendra | G05B 1/03 340/5.81 |
| 2014/0266601 | A1* | 9/2014 | Narendra | G06F 21/32 340/5.83 |
| 2014/0266602 | A1* | 9/2014 | Narendra | G06F 21/34 340/5.83 |
| 2014/0266603 | A1* | 9/2014 | Narendra | H04W 12/06 340/5.83 |
| 2014/0266605 | A1* | 9/2014 | Narendra | H04L 63/0861 340/5.84 |
| 2014/0266606 | A1* | 9/2014 | Narendra | H04W 12/06 340/5.84 |
| 2014/0270173 | A1* | 9/2014 | Narendra | H04W 12/06 380/270 |
| 2014/0270175 | A1* | 9/2014 | Narendra | H04W 12/06 380/270 |
| 2014/0273959 | A1* | 9/2014 | Narendra | H04W 12/06 455/411 |
| 2014/0273961 | A1* | 9/2014 | Narendra | H04W 12/06 455/411 |
| 2014/0281565 | A1* | 9/2014 | Narendra | H04W 12/06 713/185 |
| 2014/0281566 | A1* | 9/2014 | Narendra | H04L 63/0853 713/185 |
| 2014/0282878 | A1 | 9/2014 | Ignatchenko et al. | |
| 2014/0282987 | A1* | 9/2014 | Narendra | G06F 21/35 726/9 |
| 2014/0289517 | A1* | 9/2014 | Neumann | H04L 63/0428 713/165 |
| 2014/0337621 | A1* | 11/2014 | Nakhimov | G06F 1/163 713/168 |
| 2014/0337634 | A1* | 11/2014 | Starner | H04L 9/3231 713/186 |
| 2015/0120510 | A1* | 4/2015 | Kangshang | G06Q 20/3278 705/26.81 |
| 2015/0120573 | A1* | 4/2015 | Xia | G06Q 20/38215 705/73 |
| 2015/0135284 | A1* | 5/2015 | Bogard | H04L 63/107 726/5 |
| 2015/0154598 | A1* | 6/2015 | Forte | G06F 21/83 380/28 |
| 2015/0186636 | A1* | 7/2015 | Tharappel | G06F 21/32 726/8 |
| 2015/0186705 | A1* | 7/2015 | Magi | G06K 9/0002 382/125 |
| 2015/0248356 | A1* | 9/2015 | Li | G06F 21/64 713/193 |
| 2015/0262170 | A1* | 9/2015 | Bouda | G06Q 20/00 705/67 |
| 2015/0281191 | A1* | 10/2015 | Mardikar | H04L 51/38 713/153 |
| 2015/0286805 | A1* | 10/2015 | Lin | H04L 63/08 713/168 |
| 2015/0286813 | A1* | 10/2015 | Jakobsson | G06F 21/35 726/9 |
| 2015/0288682 | A1* | 10/2015 | Bisroev | G06F 3/0481 713/172 |
| 2015/0304851 | A1* | 10/2015 | Chen | H04W 12/08 713/172 |
| 2015/0312038 | A1* | 10/2015 | Palanisamy | H04L 9/3213 713/155 |
| 2015/0319173 | A1* | 11/2015 | Hu | H04L 63/0807 726/4 |
| 2015/0363775 | A1* | 12/2015 | Li | H04W 12/04 705/71 |
| 2015/0372811 | A1* | 12/2015 | Le Saint | H04L 9/0841 705/76 |
| 2015/0381618 | A1* | 12/2015 | Lin | H04L 63/0869 713/169 |
| 2016/0005042 | A1* | 1/2016 | Tervo | G06Q 20/4014 705/67 |
| 2016/0028547 | A1* | 1/2016 | Yao | H04L 9/0825 713/176 |
| 2016/0028548 | A1* | 1/2016 | Yao | H04L 9/30 713/176 |
| 2016/0036786 | A1* | 2/2016 | Gandhi | H04W 12/06 713/168 |
| 2016/0036793 | A1* | 2/2016 | Su | H04L 9/0825 713/171 |
| 2016/0036803 | A1* | 2/2016 | Li | G06Q 20/352 713/168 |
| 2016/0050204 | A1* | 2/2016 | Anderson | H04L 63/0876 726/4 |
| 2016/0065370 | A1* | 3/2016 | Le Saint | H04L 9/0841 713/155 |
| 2016/0092668 | A1* | 3/2016 | Ding | H04W 12/06 726/4 |
| 2016/0094525 | A1* | 3/2016 | Lin | H04W 12/02 713/171 |
| 2016/0127331 | A1* | 5/2016 | Liu | H04B 1/385 713/171 |
| 2016/0197727 | A1* | 7/2016 | Narendra | H04W 12/06 713/168 |
| 2016/0205098 | A1* | 7/2016 | Han | H04L 63/0884 713/155 |
| 2016/0226837 | A1* | 8/2016 | Kim | H04L 9/3234 |
| 2016/0227414 | A1* | 8/2016 | Wan | H04W 12/08 |
| 2016/0284207 | A1* | 9/2016 | Hou | H04L 67/125 |
| 2016/0300224 | A1* | 10/2016 | Liu | G06F 21/34 |
| 2016/0301530 | A1* | 10/2016 | He | H04L 63/0428 |
| 2016/0307179 | A1* | 10/2016 | Zou | H04L 63/0281 |
| 2016/0315773 | A1* | 10/2016 | Hou | H04L 9/30 |
| 2016/0321656 | A1* | 11/2016 | Rabinovich | G06F 21/31 |
| 2016/0321660 | A1* | 11/2016 | Liu | G06Q 10/00 |
| 2017/0064554 | A1* | 3/2017 | Li | H04L 9/32 |

(56) References Cited

U.S. PATENT DOCUMENTS

2017/0085561 A1* 3/2017 Han .................... H04L 9/08
2017/0208049 A1* 7/2017 Hu ...................... H04L 63/061

FOREIGN PATENT DOCUMENTS

| CN | 103457722 | A | 12/2013 |
| CN | 103780620 | A | 5/2014 |
| CN | 103824012 | A | 5/2014 |
| CN | 103914645 | A | 7/2014 |
| CN | 103927651 | A | 7/2014 |
| CN | 103956006 | A | 7/2014 |
| CN | 104065652 | A | 9/2014 |
| CN | 203812271 | U | 9/2014 |
| CN | 104243484 | A | 12/2014 |
| RU | 112468 | U1 | 5/2011 |
| WO | 2014143916 | A2 | 9/2014 |

OTHER PUBLICATIONS

Written Opinion (including English translation) issued in corresponding International Application No. PCT/CN2015/071368, dated Jul. 1, 2015, 13 pages.
Office Action (including English translation) issued in corresponding Chinese Patent Application No. 201410498743.6, dated Nov. 24, 2015, 15 pages.
Extended European Search Report issued in corresponding EP Application No. EP15186824, dated Feb. 15, 2016, 10 pages.
Office Action (including English translation) issued in corresponding Korean Patent Application No. 10-2015-7010164, dated Aug. 22, 2016, 10 pages.
First search issued in corresponding Chinese Patent Application No. 201410498743.6, dated May 6, 2015, 1 page.
Office Action issued in corresponding Russian Patent Application No. 2015113046/08(020442), dated Jun. 27, 2017, 14 pages.

* cited by examiner

INFORMATION INTERACTION METHODS AND DEVICES

CROSS-REFERENCE TO RELATED APPLICATION

The present application is a continuation application of International Application No. PCT/CN2015/071368, filed with the State Intellectual Property Office of P. R. China on Jan. 22, 2015, which is based upon and claims priority to Chinese Patent Application No. 201410498743.6, filed on Sep. 25, 2014, the entirety contents of which are incorporated herein by reference.

TECHNICAL FIELD

The present disclosure relates to a technical field of communication, and more particularly, to an information interaction method, an information interaction device, and an electronic device.

BACKGROUND

A user may log into a terminal by inputting a registered ID and a login password into the terminal, and then the user may make an information interaction based on the logged-in ID. However, in a case requiring a higher security, an identity of the user needs to be further verified. In a related art, generally a password for verifying the identity is required to be input by the user.

SUMMARY

According to a first aspect of embodiments of the present disclosure, there is provided an information interaction method. The method maybe implemented by an electronic device. The electronic device establishes a connection with a wearable device. The electronic device sends information to be interacted corresponding to a logged-in ID to the wearable device via the connection. The electronic device receives a first encrypted result returned by the wearable device, where the first encrypted result is obtained by encrypting the information to be interacted by the wearable device with a pre-stored encryption key uniquely corresponding to the logged-in ID. The electronic device generates a first verifying factor corresponding to the first encrypted result with a predetermined algorithm. The electronic device sends the information to be interacted and the first verifying factor in an associated manner to a server. The electronic device receives a message indicating that an interaction is finished. The message is sent if the server determines that a second verifying factor matches the first verifying factor, where the two factors match when there is a one-to-one correspondence relationship between the first and second verifying factors. The second verifying factor is generated with the predetermined algorithm and corresponds to a second encrypted result. The second encrypted result is obtained by encrypting the information to be interacted by the server with the pre-stored encryption key.

According to a second aspect of embodiments of the present disclosure, there is provided an information interaction method implemented by an electronic device. The electronic device establishes a connection with a wearable device. The electronic device sends information to be interacted corresponding to a logged-in ID to the wearable device via the connection. The electronic device receives an encrypted result returned by the wearable device, in which the encrypted result is obtained by encrypting the information to be interacted by the wearable device with a pre-stored first encryption key uniquely corresponding to the logged-in ID. The electronic device sends the encrypted result to the server. The electronic device receives a message indicating that an interaction is finished, in which the message is sent after a decryption operation on the encrypted result is performed by the server using a second encryption key matching with the first encryption key.

According to a third aspect of embodiments of the present disclosure, there is provided an information interaction method. The electronic device establishes a connection with a terminal. The electronic device receives information to be interacted sent by the terminal via the connection, in which the information to be interacted corresponds to a logged-in ID on the terminal. The electronic device encrypts the information to be interacted with a pre-stored encryption key uniquely corresponding to the logged-in ID to obtain an encrypted result. The electronic device sends the encrypted result to the terminal via the connection such that the terminal sends the encrypted result to a server or sends a verifying factor and the information to be interacted in an associated manner to the server, in which the verifying factor is generated with a predetermined algorithm and corresponds to the encrypted result.

According to a fourth aspect of embodiments of the present disclosure, there is provided an information interaction device. The information interaction device includes: a processor and a memory configured to store instructions executed by the processor. The processor is configured to: establish a connection with a wearable device; send information to be interacted corresponding to a logged-in ID to the wearable device via the connection; receive a first encrypted result returned by the wearable device, in which the first encrypted result is obtained by encrypting the information to be interacted by the wearable device with a pre-stored encryption key uniquely corresponding to the logged-in ID; generate a first verifying factor corresponding to the first encrypted result with a predetermined algorithm; send the information to be interacted and the first verifying factor in an associated manner to a server; receive a message indicating that an interaction is finished, in which the message is sent if the server determines that a second verifying factor matches the first verifying factor, in which the second verifying factor is generated with the predetermined algorithm and corresponds to a second encrypted result, in which the second encrypted result is obtained by encrypting the information to be interacted by the server with the pre-stored encryption key.

According to an fifth aspect of embodiments of the present disclosure, there is provided an information interaction device. The device includes: a processor and a memory configured to store instructions executed by the processor. The processor is configured to: establish a connection with a wearable device; send information to be interacted corresponding to a logged-in ID to the wearable device via the connection; receive an encrypted result returned by the wearable device, in which the encrypted result is obtained by encrypting the information to be interacted by the wearable device with a pre-stored first encryption key uniquely corresponding to the logged-in ID; send the encrypted result to the server; and receive a message indicating that an interaction is finished. The message is sent after a decryption operation on the encrypted result is performed by the server using a second encryption key matching with the first encryption key.

According to a sixth aspect of embodiments of the present disclosure, there is provided an information interaction device. The device includes: a processor and a memory configured to store instructions executed by the processor. The processor is configured to: establish a connection with a terminal; receive information to be interacted sent by the terminal via the connection, in which the information to be interacted corresponds to a logged-in ID on the terminal; encrypt the information to be interacted with a pre-stored encryption key uniquely corresponding to the logged-in ID to obtain an encrypted result; and send the encrypted result to the terminal via the connection such that the terminal sends the encrypted result to a server or sends a verifying factor and the information to be interacted in an associated manner to the server. The verifying factor is generated with a predetermined algorithm and corresponds to the encrypted result.

According to a seventh aspect of embodiments of the present disclosure, there is provided a non-transitory computer-readable storage medium configured to store instructions. When executed by a processor of a device, the instructions cause the device to perform an information interaction method. The method includes: establishing a connection with a wearable device; sending information to be interacted corresponding to a logged-in ID to the wearable device via the connection; receiving a first encrypted result returned by the wearable device, in which the first encrypted result is obtained by encrypting the information to be interacted by the wearable device with a pre-stored encryption key uniquely corresponding to the logged-in ID; generating a first verifying factor corresponding to the first encrypted result with a predetermined algorithm; sending the information to be interacted and the first verifying factor in an associated manner to a server; and receiving a message indicating that an interaction is finished. The message is sent if the server determines that a second verifying factor matches the first verifying factor, in which the second verifying factor is generated with the predetermined algorithm and corresponds to a second encrypted result. The second encrypted result is obtained by encrypting the information to be interacted by the server with the pre-stored encryption key.

According to an eighth aspect of embodiments of the present disclosure, there is provided a non-transitory computer-readable storage medium configured to store instructions that, when executed by a processor of a device, cause the device to perform an information interaction method. The method includes: establishing a connection with a wearable device; sending information to be interacted corresponding to a logged-in ID to the wearable device via the connection; receiving an encrypted result returned by the wearable device, in which the encrypted result is obtained by encrypting the information to be interacted by the wearable device with a pre-stored first encryption key uniquely corresponding to the logged-in ID; sending the encrypted result to the server; and receiving a message indicating that an interaction is finished. The message is sent after a decryption operation on the encrypted result is performed by the server using a second encryption key matching with the first encryption key.

According to a ninth aspect of embodiments of the present disclosure, there is provided a non-transitory computer-readable storage medium configured to store instructions. When executed by a processor of a device, the instructions cause the device to perform an information interaction method. The method includes: establishing a connection with a terminal; receiving information to be interacted sent by the terminal via the connection, in which the information to be interacted corresponds to a logged-in ID on the terminal; encrypting the information to be interacted with a pre-stored encryption key uniquely corresponding to the logged-in ID to obtain an encrypted result; and sending the encrypted result to the terminal via the connection such that the terminal sends the encrypted result to a server or sends a verifying factor and the information to be interacted in an associated manner to the server. The verifying factor is generated with a predetermined algorithm and corresponds to the encrypted result.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

The technical solution disclosed in the embodiments of the present disclosure has an advantageous effect as follows.

By presetting a pair of encryption keys corresponding to a user ID, and storing the pair of encryption keys in the wearable device and the server respectively, such that an encryption key stored in the wearable device may be verified by the server by encrypting the information to be interacted by the wearable device. In this way, an identity of a user may be verified, and operations that the user inputs a password for verifying the identity manually may be avoided, thus facilitating to improve the efficiency of information interaction.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Figure 1A:
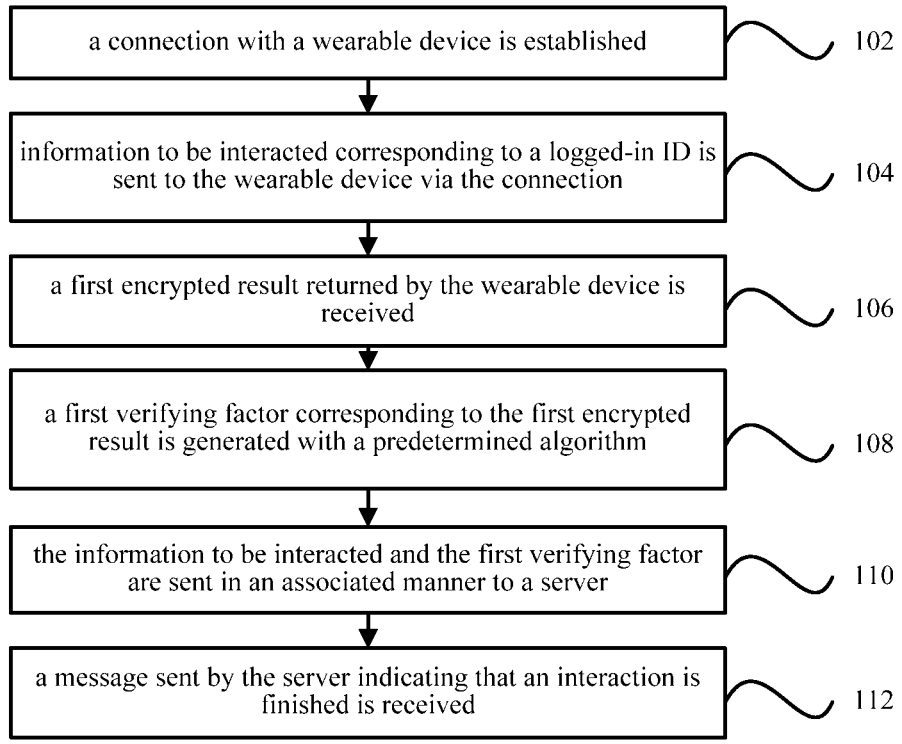
FIG. 1A is a flow chart illustrating an information interaction method based on a terminal according to one or more embodiments of the present disclosure.

Referring to FIG. 1A, FIG. 1A is a flow chart illustrating an information interaction method based on a terminal according to one or more embodiments of the present disclosure. The information interaction method is used in the terminal, and may include following steps.

In step 102, a connection with a wearable device is established.

In one or more embodiments, the wearable device may include a portable device which is wearable or can be integrated on clothes and accessories of a user, for example, smart glasses, a smart watch, a smart bracelet, a smart shoe, etc. But a specific type of the wearable device is not limited herein.

In one or more embodiments, the connection with the wearable device may be implemented by the terminal in various ways. As an exemplary implementation, the connection may be a wired connection, such as a connection via a Micro USB line. As an exemplary implementation, the connection may be a wireless connection, such as a Blue Tooth connection, an infrared connection, a wireless fidelity (WIFI) connection, etc. But a specific type of the connection is not limited herein.

In step 104, information to be interacted corresponding to a logged-in ID is sent to the wearable device via the connection.

In step 106, a first encrypted result returned by the wearable device is received, in which the first encrypted result is obtained by encrypting the information to be interacted by the wearable device with a pre-stored encryption key uniquely corresponding to the logged-in ID.

In one or more embodiments, a user may perform corresponding operations (such as viewing data, activating a predetermined function etc.) by logging in a pre-registered user ID on the terminal. In a case requiring a higher security, if an identity of the user needs to be verified, a password for verifying the identity is not required to be input by the user manually, but the terminal sends the information to be interacted to the wearable device after the information to be interacted is determined by the user, and the wearable device encrypts the information to be interacted, in other words, a digital signature is performed on the information to be interacted.

In one or more embodiments, the user only needs to determine the information to be interacted, while an information transmission between the terminal and the wearable device and encryption operations of the wearable device are transparent to the user. In other words, a procedure of verifying the identity does not exist from the user's perspective, such that operations and actions of the user in the whole process is simplified, thus both facilitating to improve the user experience and accelerating the speed of information interaction.

In step 108, a first verifying factor corresponding to the first encrypted result is generated with a predetermined algorithm.

In one or more embodiments, by presetting same algorithms in the wearable device and the server respectively, a first verifying factor generated by the wearable device matches a second verifying factor generated by the server in a case that the identity of the user is correct. In this way, the identity of the user may be verified. Alternatively or additionally, the identity of the user may be verified as long as the first verifying factor and the second verifying factor meet a predetermined condition. For example, the predetermined condition may include a rule to verify whether the first verifying factor and the second verifying factor have a one-to-one correspondence relationship.

In one or more embodiments, the predetermined algorithm may be an irreversible algorithm. In other words, the first verifying factor is generated according to the first encrypted result, but the first encrypted result cannot be determined according to the first verifying factor, such that a security is guaranteed. The predetermined algorithm may be a Message-Digest Generating Algorithm, such as Message-Digest Algorithm 5 (MD5), Secure Hash Algorithm (SHA), etc. By generating the first verifying factor, an integrity check may be performed by the server on the received information to be interacted, and the pre-stored encryption key applied by the wearable device may be reflected, meanwhile, the amount of data exchange may be reduced, and the efficiency of information interaction may be improved.

In step 110, the information to be interacted and the first verifying factor are sent in an associated manner to a server, such that the server may encrypt the information to be interacted with the pre-stored encryption key to obtain a second encrypted result.

In step 112, a message sent by the server indicating that an interaction is finished is received if it is determined by the server that a second verifying factor generated with the predetermined algorithm and corresponding to the second encrypted result matches the first verifying factor. In other words, the message is sent if the server determines that the second verifying factor generated with the predetermined algorithm and corresponding to the second encrypted result matches the first verifying factor, in which the second encrypted result is obtained by encrypting the information to be interacted by the server with the pre-stored encryption key.

In one or more embodiments, the encryption key applied by the wearable device and the encryption key applied by the server are the same, i.e. symmetric encryption keys. The encryption key may be transmitted by the terminal to the wearable device and may be stored in the wearable device after the encryption key is generated by the server. In one or more embodiments, one encryption key corresponds to one logged-in ID uniquely, such that if the first verifying factor matches the second verifying factor, which indicates that the wearable device and the server apply the same encryption key, the identity of the user may be verified.

Figure 1B:
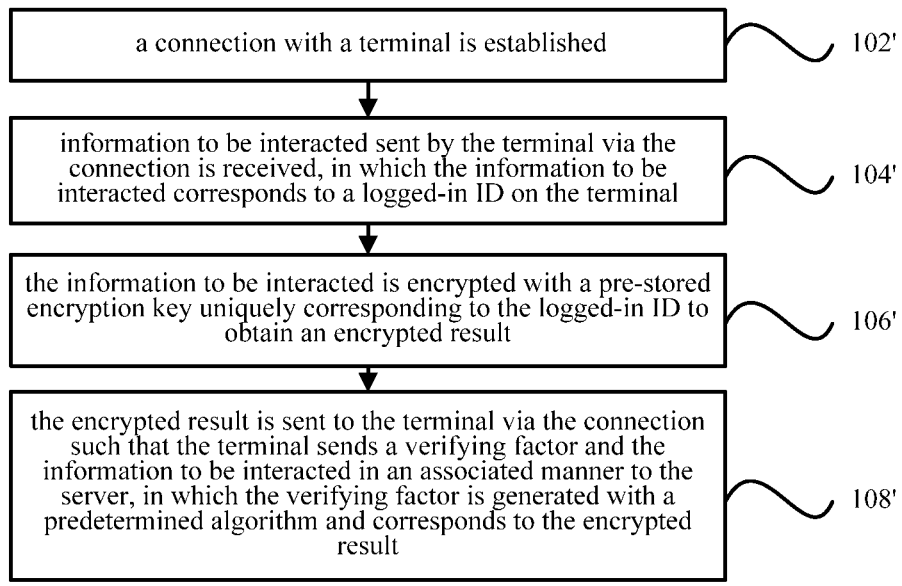
FIG. 1B is a flow chart illustrating an information interaction method based on a wearable device according to one or more embodiments of the present disclosure.

Corresponding to FIG. 1A, FIG. 1B is a flow chart illustrating an information interaction method based on a wearable device according to one or more embodiments. The information interaction method may include following steps.

In step 102', a connection with a terminal is established.

In step 104', information to be interacted sent by the terminal via the connection is received, in which the information to be interacted corresponds to a logged-in ID on the terminal.

In step 106', the information to be interacted is encrypted with a pre-stored encryption key uniquely corresponding to the logged-in ID to obtain an encrypted result.

In one or more embodiments, the pre-stored encryption key applied by the wearable device uniquely corresponds to the logged-in ID on the terminal. In other words, a user sends the information to be interacted to the wearable device using the logged-in ID. Meanwhile, a matched encryption key corresponding to the logged-in ID is stored in the server. The pre-stored encryption key stored in the wearable device and the matched encryption key stored in the server may be symmetric encryption keys.

In step 108', the encrypted result is sent to the terminal via the connection such that the terminal sends a verifying factor and the information to be interacted in an associated manner to the server, in which the verifying factor is generated with a predetermined algorithm and corresponds to the encrypted result.

In one or more embodiments, corresponding to descriptions of FIG. 1A, after receiving the verifying factor and the information to be interacted sent by the terminal, the server encrypts the information to be interacted according to the pre-stored encryption key corresponding to the logged-in ID so as to obtain another encrypted result, and generates another verifying factor corresponding to the another encrypted result with a predetermined algorithm the same as the predetermined algorithm applied by the terminal. If the another verifying factor is the same as the received verifying factor, the server and the wearable device apply the same encryption key, such that the identity of the user is verified and the data integrity of the verifying factor and the information to be interacted received by the server in a transmission process is checked.

According to the above embodiment of the present disclosure, by storing encryption keys corresponding to the logged-in ID in the wearable device and the server respectively, using a strong association relationship between the wearable device and the user (since the wearable device is a device meeting daily requirements, generally the wearable device is only used by a user himself/herself), and verifying whether the wearable device and the serve apply the same encryption key to encrypt the information to be interacted, the identity of the user may be verified quickly, without manually inputting a password for verifying the identity by the user, thus facilitating to improve the efficiency of information interaction.

Figure 2:
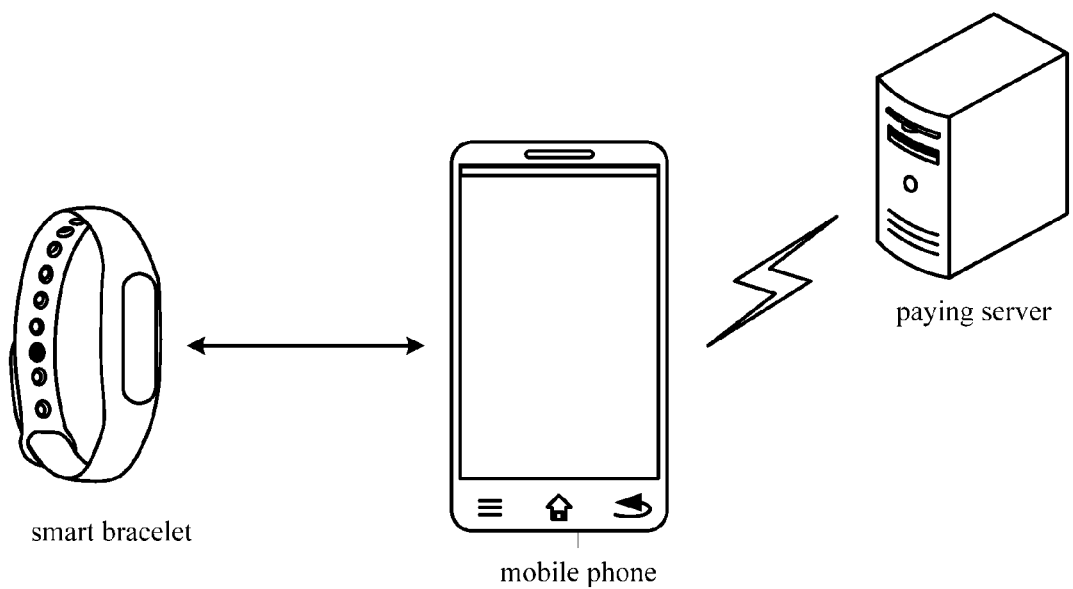
FIG. 2 is a scheme diagram illustrating an information interaction scene according to one or more embodiments of the present disclosure.
Figure 3:
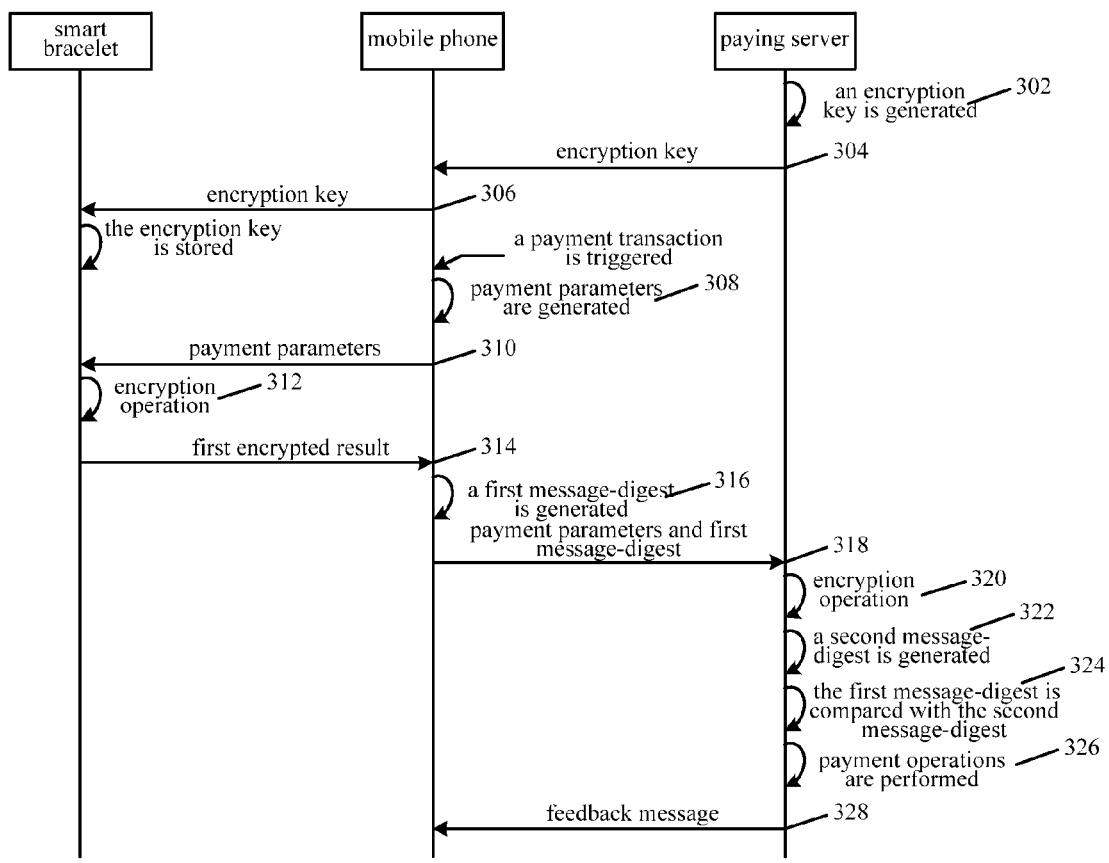
FIG. 3 is a flow chart illustrating an information interaction method in a payment scene according to one or more embodiments of the present disclosure.

The technical solution according to the present disclosure may be applied in an information interaction process in any scene whose specific type is not limited herein. As one or more embodiments, FIG. 2 illustrates a typical application scene, comprising: a smart bracelet, a mobile phone, and a paying server. If a user deals a payment transaction by the mobile phone, an identity of the user may be verified quickly using a pre-matched smart bracelet, such that the payment transaction may be operated on the paying server. FIG. 3 illustrates a flow chart of an information interaction method corresponding to a process flow illustrated in FIG. 1 and applied in the payment scene illustrated in FIG. 2. The information interaction method includes following steps.

1) Matching Process

In step 302, an encryption key may be generated by the paying server in response to a matching request sent by the user using the mobile phone. The encryption key may uniquely correspond to a logged-in ID of the user on the mobile phone.

For example, the user may initiate the matching request at any time so as to establish an association relationship between the smart bracelet and a user ID. Also, the user may modify the association relationship between the smart bracelet and the user ID.

In the embodiments, for the convenience of user, particularly in a case that the user registers multiple user IDs or the smart bracelet is expected to be shared among family members, the smart bracelet may be matched with the multiple user IDs, and the multiple user IDs and encryption keys corresponding respectively to the multiple user IDs may be stored in the smart bracelet in an associated manner. Of course, the user may limit the number of the encryption keys allowed to be stored in the bracelet, such that the privacy of the smart bracelet may be improved.

The server may generate the encryption key in some embodiments. Alternatively or additionally, the encryption key corresponding to the logged-in ID may be generated by a wearable device and be sent to a terminal, and the terminal sends the encryption key to the server.

In step 304, the generated encryption key corresponding to the logged-in ID may be sent by the paying server to the mobile phone.

In step 306, the received encryption key may be sent by the mobile phone to the smart bracelet, such that the smart bracelet stores the encryption key and the logged-in ID in an associated manner.

Based on steps 302-306, the smart bracelet and the server may respectively store the encryption key and the user ID in an associated manner, and with respect to one user ID, the smart bracelet and the server apply one encryption key uniquely corresponding to the user ID, thus facilitating subsequent operations of verifying the identity.

2) Identity Verification

In step 308, corresponding payment parameters (such as a payment target, an amount of payment, a payment account, etc.) are generated based on a triggered payment transaction on the mobile phone.

In step 310, the generated payment parameters may be sent by the mobile phone to the smart bracelet.

In one or more embodiments, a wireless connection between the mobile phone and the smart bracelet may be realized in any manner (such as Blue Tooth communication, infrared communication, near field communication) such that a wireless data communication may be realized.

In step 312, the received payment parameters may be encrypted by the smart bracelet based on the pre-stored encryption key.

In step 314, a generated first encrypted result may be sent by the smart bracelet to the mobile phone.

In step 316, a first message-digest corresponding to the first encrypted result is generated by the mobile phone with MD5 algorithm.

Alternatively or additionally, other types of Message-Digest Algorithms (such as SHA algorithm) may be used.

In step 318, the original payment parameters (i.e. payment parameters being not processed by procedures such as an encryption procedure) and the first message-digest may be sent by the mobile phone in an associated manner to the paying server.

In step 320, the received original payment parameters may be encrypted by the paying server with the encryption key corresponding to the current logged-in ID so as to generate a second encrypted result.

In step 322, a second message-digest corresponding to the generated second encrypted result may be generated with a Message-Digest Algorithm (such as MD5 algorithm) the same as the Message-Digest Algorithm applied by the smart bracelet.

In step 324, the first message-digest may be compared with the second message-digest.

In one or more embodiments, if no error occurs in a data transmission process between the mobile phone and the paying server, the smart bracelet and the paying server receive the same payment parameters. Thus, if the identity of the user is correct, the encryption key applied by the smart bracelet is the same as the encryption key applied by the paying server, the Message-Digest Algorithm applied by the smart bracelet is the same as the Message-Digest Algorithm applied by the paying server, and the first message-digest is the same as the second message-digest. If the first message-digest and the second message-digest are different, the reason may be that the identity of the user is verified to be incorrect or an error occurs in the data transmission process. This may indicate that an environment in which the payment transaction is operated is not secure, and the payment transaction should be terminated.

In step 326, if the first message-digest is the same as the second message-digest, which indicates the identity of the user is verified to be correct, corresponding payment operations may be performed by the paying server according to the received payment parameters.

In step 328, a feedback message indicating that the payment transaction is finished is sent by the paying server to the mobile phone.

Referring to FIG. 4, FIG. 4 is a flow chart illustrating another information interaction method according to one or more embodiments. The information interaction method may be implemented in a terminal and may include following steps.

In step 402, a connection with a wearable device is established.

In one or more embodiments, the wearable device may include a portable device which is wearable or may be integrated on clothes and accessories of a user, for example, smart glasses, a smart watch, a smart bracelet, a smart shoe, etc. But a specific type of the wearable device is not limited herein.

In one or more embodiments, the connection with the wearable device may be implemented in various ways by the terminal. As an exemplary implementation, the connection may be a wired connection, such as a connection via a Micro USB line. As an exemplary implementation, the connection may be a wireless connection, such as a Blue Tooth connection, an infrared connection, a WIFI connection, etc. But a specific type of the connection is not limited herein.

In step 404, information to be interacted corresponding to a logged-in ID is sent to the wearable device via the connection.

In step 406, an encrypted result returned by the wearable device is received, in which the encrypted result is obtained by encrypting the information to be interacted by the wearable device with a pre-stored first encryption key uniquely corresponding to the logged-in ID.

For example, a user may perform corresponding operations (such as viewing data, activating a predetermined function etc.) by logging in a pre-registered user ID on the terminal. In a case requiring a higher security, if an identity of the user needs to be verified, a password for verifying the identity is not required to be input by the user manually, but the terminal sends the information to be interacted to the wearable device after the information to be interacted is determined by the user, and the wearable device encrypts the information to be interacted. In other words, a digital signature may be performed on the information to be interacted.

In one or more embodiments, the user may only need to determine the information to be interacted, while an information transmission between the terminal and the wearable device and encryption operations of the wearable device are transparent to the user. In other words, a procedure of verifying the identity does not exist from the user's perspective, such that operations and actions of the user in the whole process is simplified, thus both facilitating to improve the user experience and accelerating the speed of information interaction.

In step 408, the terminal may send the encrypted result the server.

In step 410, the terminal may receive a message indicating that an interaction is finished, where the message is sent by the server after a decryption operation on the encrypted result is performed by the server using a second encryption key matching with the first encryption key. At least one of the first and second encryption keys may be preset at least partially based on an identification number of the wearable device. Alternatively or additionally, the wearable device may communicate with the terminal device via a wireless router. In that case, at least one of the first and second encryption keys may be preset at least partially based on an identification number of the wireless router communicating with both the wearable device and the terminal.

In one or more embodiments, since the wearable device uses an encryption key (i.e. the first encryption key) and the server uses an encryption key (i.e. the second encryption key) matching with the encryption key used by the wearable device, if the server can decrypt the encrypted result from the terminal, it is indicated the encrypted result is generated by the encryption of the first encryption key. Since the first encryption key uniquely corresponds to the user ID, the identity of the user may be verified.

Figure 4A:
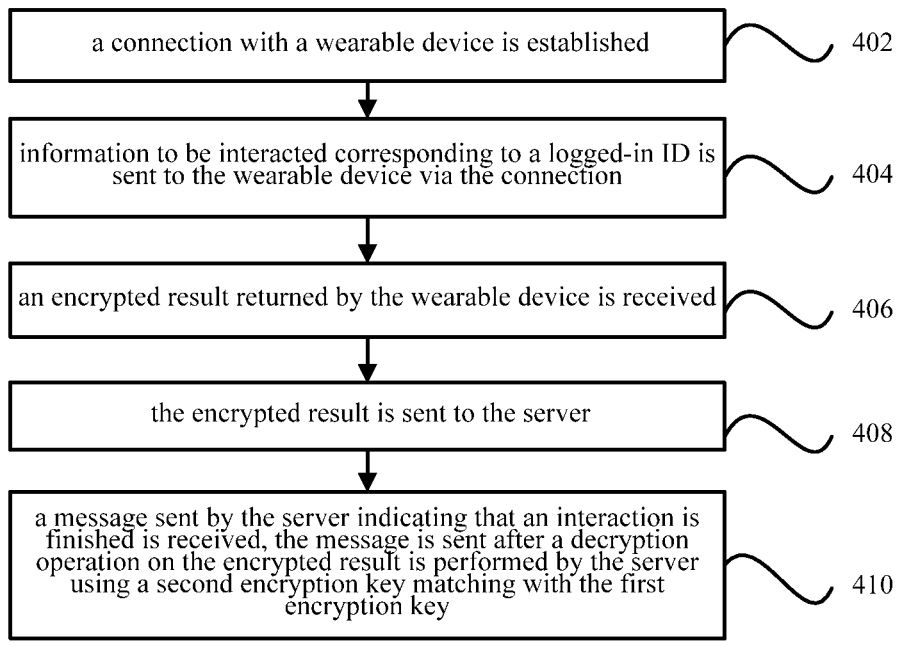
FIG. 4A is a flow chart illustrating another information interaction method based on a terminal according to one or more embodiments of the present disclosure.
Figure 4B:
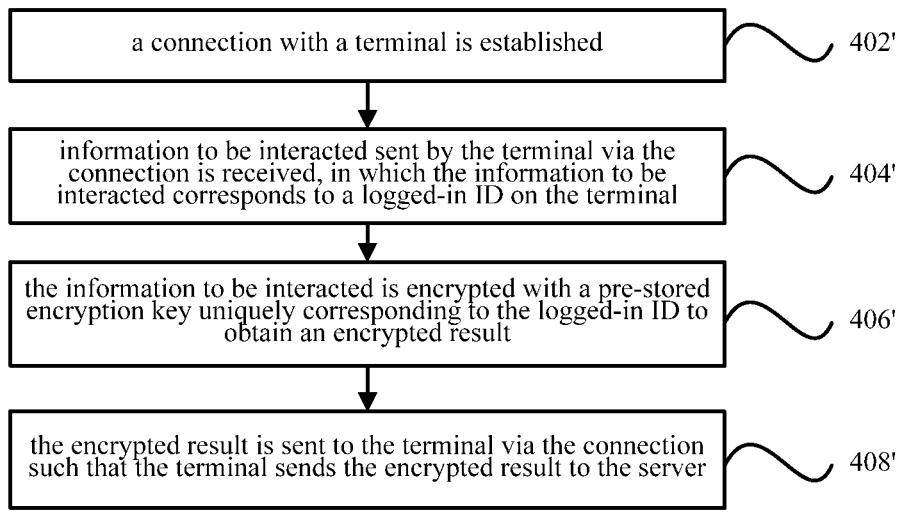
FIG. 4B is a flow chart illustrating another information interaction method based on a wearable device according to one or more embodiments of the present disclosure.

Corresponding to FIG. 4A, FIG. 4B is a flow chart illustrating another information interaction method based on a wearable device according to one or more embodiments. The information interaction method may include following steps.

In step 402', a connection with a terminal is established.

In step 404', information to be interacted sent by the terminal via the connection is received, in which the information to be interacted corresponds to a logged-in ID on the terminal.

In step 406', the information to be interacted is encrypted with a pre-stored encryption key uniquely corresponding to the logged-in ID to obtain an encrypted result.

In one or more embodiments, the pre-stored encryption key applied by the wearable device corresponds to the logged-in ID on the terminal. A user sends the information to be interacted to the wearable device using the logged-in ID. Meanwhile, an encryption key matched with the logged-in ID is stored in the server, and the pre-stored encryption key stored in the wearable device and the matched encryption key stored in the server may be symmetric encryption keys or asymmetric encryption keys.

In step 408', the encrypted result is sent to the terminal via the connection, and the terminal sends the encrypted result to the server.

In one or more embodiments, corresponding to descriptions of FIG. 4, the server may try to perform a decryption operation on the encrypted result according to the pre-stored encryption key corresponding to the logged-in ID after receiving the encrypted result sent by the terminal. If an identity of the user is verified to be correct, the encryption key selected by the server and corresponding to the logged-in ID matches with the encryption key applied by the wearable device, and the decryption operation may be successfully performed by the server so as to obtain information to be interacted.

According to the above embodiment of the present disclosure, by storing the first encryption key corresponding to the logged-in ID in the wearable device and the second encryption key corresponding to the logged-in ID in the server respectively, using a strong association relationship between the wearable device and the user (since the wearable device is a device meeting daily requirements, generally the wearable device is only used by a user himself/herself), and verifying whether the first encryption key that the wearable device applies to encrypt the information to be interacted matches with the second encryption key that the server applies to perform the decryption operation, the identity of the user may be verified quickly, without manually inputting a password for verifying the identity by the user, thus facilitating to improve the efficiency of information interaction.

Figure 5:
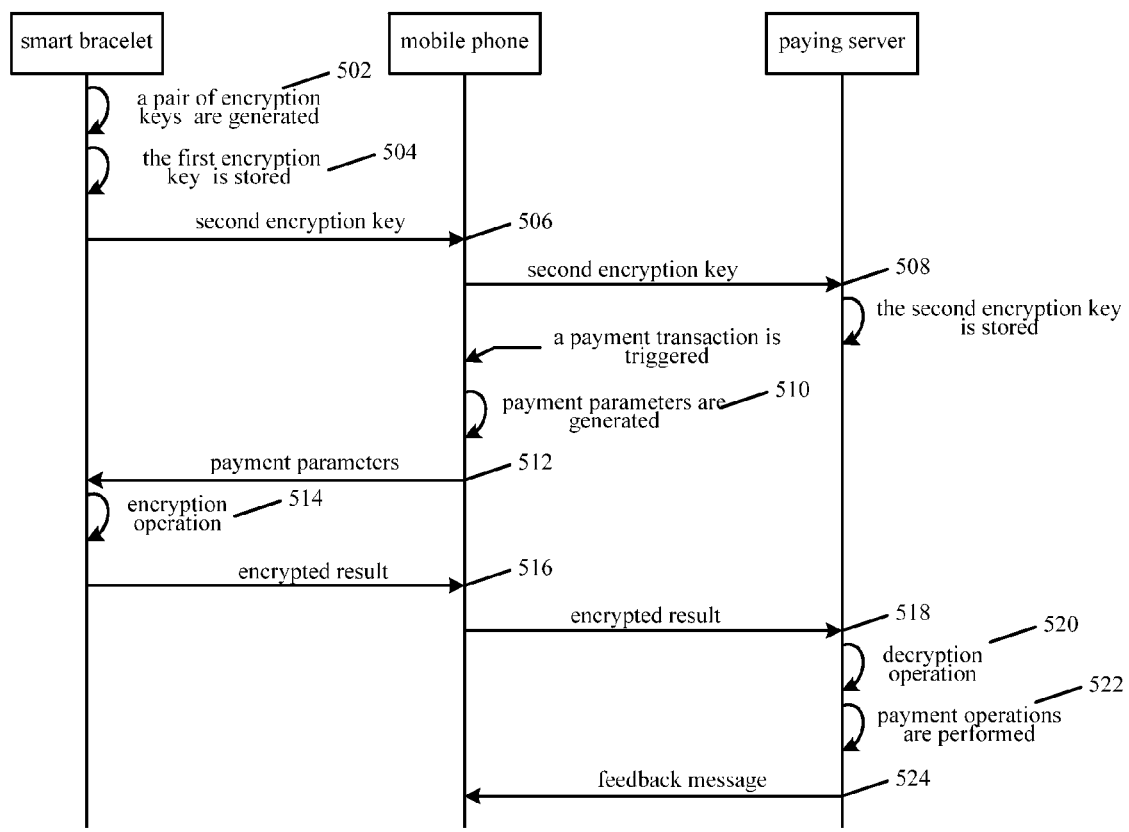
FIG. 5 is a flow chart illustrating another information interaction method in a payment scene according to one or more embodiments of the present disclosure.

Similar to the embodiment illustrated in FIG. 1, one or more embodiments may also be applied in an information interaction process in any scene whose specific type is not limited herein. Corresponding to a process flow illustrated in FIG. 4, FIG. 5 illustrates a flow chart of an information interaction method applied in the payment scene illustrated in FIG. 2 according to an embodiment. The information interaction method includes following steps.

1) Matching Process

In step 502, a pair of encryption keys used to encrypt information are generated by a smart bracelet.

In one or more embodiments, the smart bracelet may generate the pair of encryption keys at any time, for example, the pair of encryption keys may be generated automatically after the smart bracelet is activated, or be generated in response to a matching request sent by a user.

In one or more embodiments, the pair of encryption keys may be asymmetric encryption keys. A first encryption key stored in the smart bracelet is a private key and a second encryption key stored in the paying server is a public key.

Alternatively or additionally, symmetric encryption keys may be used. A pair of symmetrical encryption keys, such as a first encryption key and a second encryption key which is the same as the first encryption key, may be generated by the server. The first encryption key is sent by the server to the mobile phone, the mobile phone sends the first encryption key to the smart bracelet, and then the smart bracelet stores the first encryption key.

In step 504, the first encryption key in the pair of encryption keys is stored by the smart bracelet.

In step 506, the second encryption key in the pair of encryption keys sent by the smart bracelet is received by the mobile phone. The first encryption key matches with the second encryption key.

In one or more embodiments, the smart bracelet may send the second encryption key to the mobile phone in response to the matching request sent by the user using the mobile phone. If the mobile phone sends the matching request, the current logged-in ID may be sent to the smart bracelet, such that an association between the logged-in ID and the first encryption key and an association between the logged-in ID and the second encryption key may be established. Actually, an association relationship between the logged-in ID and the pair of encryption keys is established.

In step 508, the second encryption key is sent by the mobile phone to the paying server, such that the paying server stores the second encryption key.

In one or more embodiments, the mobile phone may send the matching request to the paying server (i.e., the user sends the corresponding matching request using the current logged-in ID), such that the paying server stores the received second encryption key and the logged-in ID in an associate manner.

2) Identity Verification

In step 510, corresponding payment parameters (such as a payment target, an amount of payment, a payment account, etc.) are generated based on a triggered payment transaction on the mobile phone.

In step 512, the generated payment parameters are sent by the mobile phone to the smart bracelet.

In one or more embodiments, a wireless connection between the mobile phone and the smart bracelet may be realized in any manner (such as Blue Tooth communication, infrared communication, near field communication), such that a wireless data communication may be realized.

In step 514, the received payment parameters may be encrypted by the smart bracelet based on the pre-stored first encryption key.

In step 516, a generated encrypted result may be sent by the smart bracelet to the mobile phone.

In step 518, the encrypted result may be sent by the mobile phone to the paying server.

In step 520, an decryption operation may be performed on the encrypted result by the paying server with the corresponding second encryption key based on the current logged-in ID.

In step 522, if the decryption operation on the encrypted result is successfully performed, the second encryption key matches with the first encryption key applied by the smart bracelet, such that the identity of the current logged-in ID is verified to be correct, and corresponding payment operations may be performed.

In step 524, the paying server may send a feedback message to the mobile phone, where the feedback message indicates that the payment transaction is finished.

Figure 6:
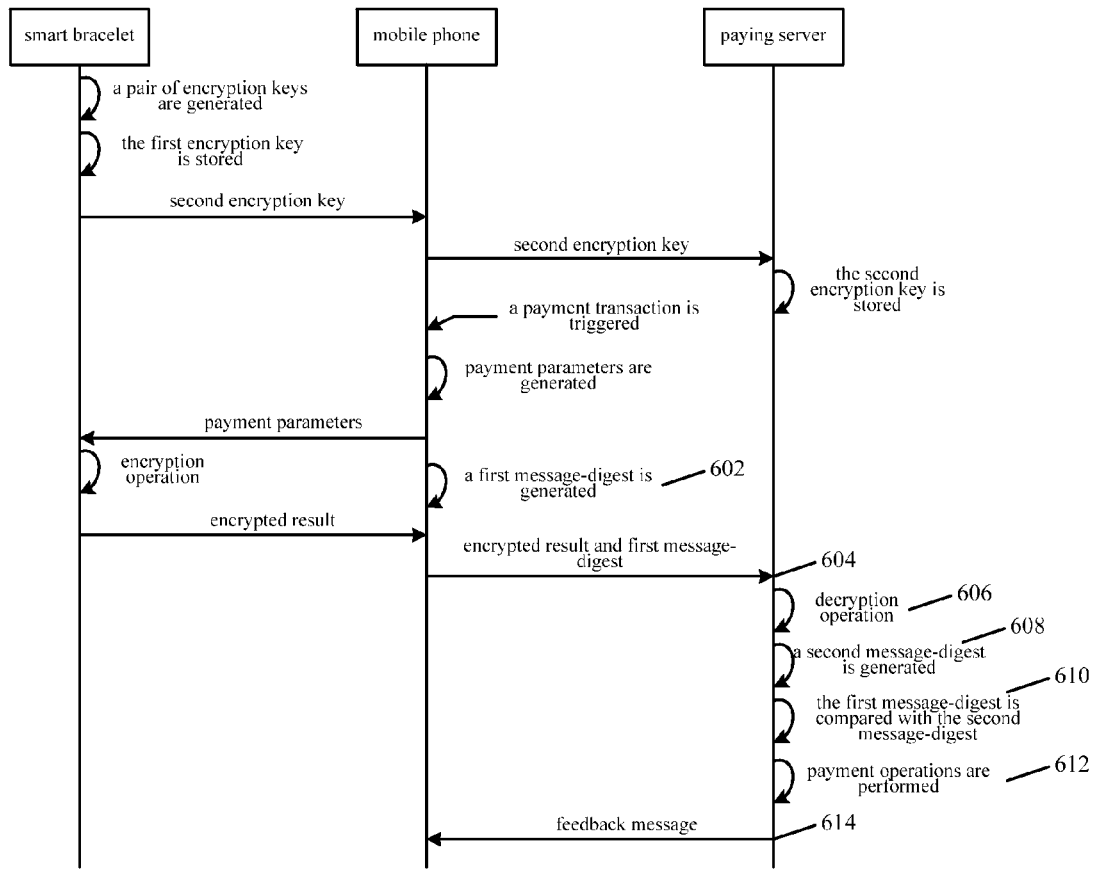
FIG. 6 is a flow chart illustrating another information interaction method in a payment scene according to one or more embodiments of the present disclosure.

Corresponding to a process flow illustrated in FIG. 4, FIG. 6 illustrates a flow chart of an information interaction method applied in the payment scene illustrated in FIG. 2 according to another embodiment. Steps from a step of generating the pair of encryption keys by the smart bracelet in the matching process 1) to a step of encrypting the payment parameters by the smart bracelet and returning the encrypted result in the identity verification 2) are same to the steps 502-516 illustrated in FIG. 5, with following exceptions.

In step 602, a corresponding first message-digest is generated by the mobile phone with a predetermined algorithm based on the generated original payment parameters. The predetermined algorithm may be a MD5 algorithm, a SHA algorithm, etc.

In one or more embodiments, the mobile phone generates the first message-digest and the smart bracelet generates the encrypted result. A specific order of generating the first message-digest and the encrypted result is not limited, and the specific order does not affect the processing result.

In step 604, the encrypted result and the first message-digest may be sent by the mobile phone in an associated manner to the paying server.

In step 606, a decryption operation may be performed by the paying server on the received encrypted result with the corresponding second encryption key according to the current logged-in ID. If the decryption operation is successfully performed, it is indicated that the second encryption key matches with the first encryption key applied by the smart bracelet, such that the identity of the user is verified.

In step 608, a second message-digest corresponding to payment parameters obtained according to the decryption operation may be generated by the paying server with the predetermined algorithm.

In step 610, the received first message-digest is compared with the generated second message-digest to verify an integrity of the encrypted result in the transmission process of step S604.

In step 612, if the identity of the user is verified and the integrity is guaranteed, a current environment of the payment transaction is secure, corresponding payment operations may be performed.

In step 614, a feedback message indicating that the payment transaction is finished is sent by the paying server to the mobile phone.

Corresponding to the embodiment of the information interaction method illustrated in FIG. 1A, the present disclosure further provides an embodiment of an information interaction device.

Figure 7:
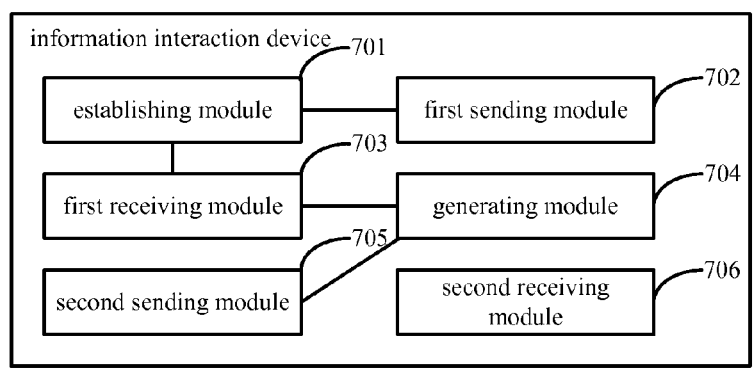
FIG. 7 is a block diagram illustrating an information interaction device based on a terminal according to one or more embodiments of the present disclosure.

FIG. 7 is a block diagram illustrating an information interaction device based on a terminal according to one or more embodiments. Referring to FIG. 7, the information interaction device may include an establishing module 701, a first sending module 702, a first receiving module 703, a generating module 704, a second sending module 705 and a second receiving module 706. The establishing module 701 is configured to establish a connection with a wearable device. The first sending module 702 is configured to send information to be interacted corresponding to a logged-in ID to the wearable device via the connection. The first receiving module 703 is configured to receive a first encrypted result returned by the wearable device, in which the first encrypted result is obtained by encrypting the information to be interacted by the wearable device with a pre-stored encryption key uniquely corresponding to the logged-in ID. The generating module 704 is configured to generate a first verifying factor corresponding to the first encrypted result with a predetermined algorithm. The second sending module 705 is configured to send the information to be interacted and the first verifying factor in an associated manner to a server. The second receiving module 706 is configured to receive a message sent by the server indicating that an interaction is finished, in which the message is sent if the server determines that a second verifying factor is the same as the first verifying factor, in which the second verifying factor is generated with the predetermined algorithm and corresponds to a second encrypted result, in which the second encrypted result is obtained by encrypting the information to be interacted by the server with the pre-stored encryption key.

In the embodiments, by presetting a pair of encryption keys corresponding to a user ID, and storing the pair of encryption keys in the wearable device and the server respectively, the wearable device may encrypt the information to be verified. Thus, an encryption key stored in the wearable device may be verified by the server. In this way, an identity of a user may be verified without operations that include manual password inputs. The disclosed methods and devices thus facilitate to improve the efficiency of information interaction.

Alternatively or additionally, the predetermined algorithm may include a Message-Digest Generating Algorithm.

Figure 8:
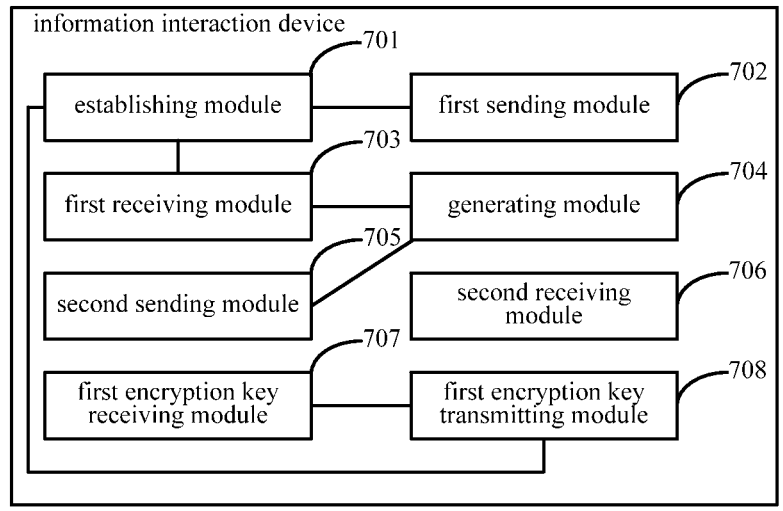
FIG. 8 is a block diagram illustrating another information interaction device based on a terminal according to an embodiment of the present disclosure.

As shown in FIG. 8, FIG. 8 is a block diagram illustrating another information interaction device based on a terminal according to one or more embodiments. Based on the embodiment illustrated in FIG. 7, the information interaction device may further include a first encryption key receiving module 707 and a first encryption key transmitting module 708. The first encryption key receiving module is configured to receive the encryption key sent by the wearable device. The first encryption key transmitting module is configured to send the encryption key to the server such that the server stores the pre-stored encryption key and the logged-in ID in an associated manner.

In the above-mentioned embodiment, the encryption key may be generated by the wearable device and be sent to the server by the terminal, such that both the wearable device and the server store the encryption key, and the encryption key uniquely corresponds to the logged-in ID.

Figure 9:
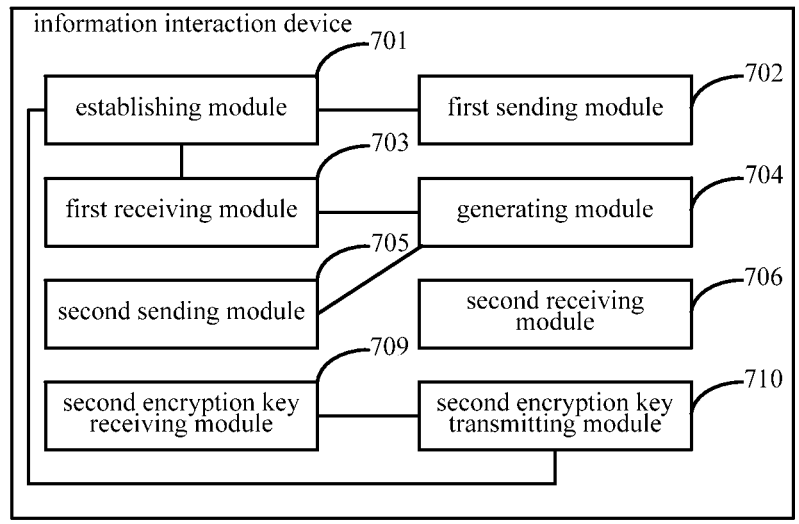
FIG. 9 is a block diagram illustrating another information interaction device based on a terminal according to one or more embodiments of the present disclosure.

As shown in FIG. 9, FIG. 9 is a block diagram illustrating another information interactive device based on a terminal according to one or more embodiments. Based on the embodiment illustrated in FIG. 7, the information interaction device may further include a second encryption key receiving module 709 and a second encryption key transmitting module 710. The second encryption key receiving module 709 is configured to receive the encryption key sent by the server. The second encryption key transmitting module 710 is configured to transmit the encryption key to the wearable device via the connection such that the wearable device stores the encryption key and the logged-in ID in an associated manner.

In one or more embodiments, the encryption key may be generated by the server and be sent to the wearable device by the terminal, such that both the wearable device and the server store the encryption key, and the encryption key uniquely corresponds to the logged-in ID.

In embodiments illustrated in FIG. 8 and FIG. 9, if the pair of encryption keys are symmetric encryption keys, the amount of data exchange may be reduced and an integrity of the information to be interacted received by the server may be verified by generating a message-digest corresponding to the encrypted result and sending the message-digest and the information to be interacted to the server, such that the security of data may be improved.

Corresponding to the embodiment of the information interaction method illustrated in FIG. 4A, the present disclosure further provides an embodiment of an information interaction device.

Figure 10:
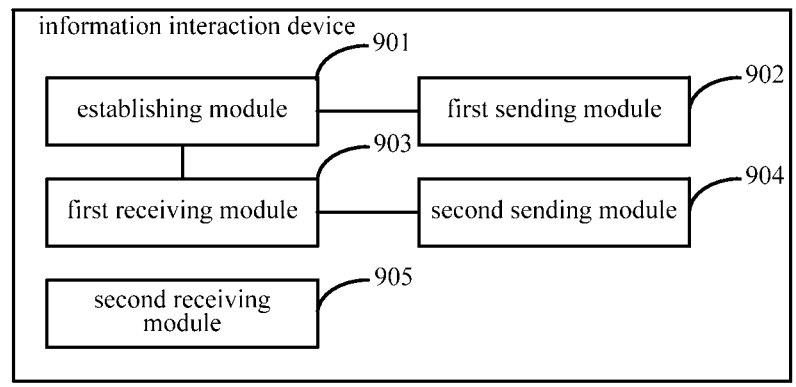
FIG. 10 is a block diagram illustrating another information interaction device based on a terminal according to one or more embodiments of the present disclosure.

FIG. 10 is a block diagram illustrating an information interaction device based on a terminal according to one or more embodiments. Referring to FIG. 10, the information interaction device may include an establishing module 901, a first sending module 902, a first receiving module 903, a second sending module 904 and a second receiving module 905. The establishing module 901 is configured to establish a connection with a wearable device. The first sending module 902 is configured to send information to be interacted corresponding to a logged-in ID to the wearable device via the connection. The first receiving module 903 is configured to receive an encrypted result returned by the wearable device, in which the encrypted result is obtained by encrypting the information to be interacted by the wearable device with a pre-stored first encryption key uniquely corresponding to the logged-in ID. The second sending module 904 is configured to send the encrypted result to the server. The second receiving module 905 is configured to receive a message sent by the server indicating that an interaction is finished, in which the message is sent after a decryption operation on the encrypted result is performed by the server using a second encryption key matching with the first encryption key.

In the embodiments, by presetting a pair of encryption keys corresponding to a user ID, and storing the pair of encryption keys in the wearable device and the server respectively, such that an encryption key stored in the wearable device may be verified by the server by encrypting the information to be interacted by the wearable device. In this way, an identity of a user may be verified without manual password inputs for verifying the identity, thus facilitating to improve the efficiency of information interaction.

Figure 11:
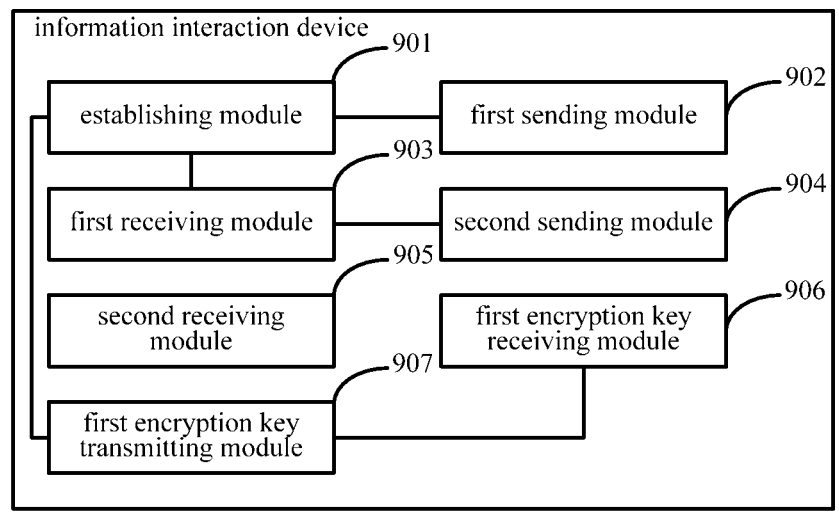
FIG. 11 is a block diagram illustrating another information interaction device based on a terminal according to one or more embodiments of the present disclosure.

As shown in FIG. 11, FIG. 11 is a block diagram illustrating another information interaction device based on a terminal according to one or more embodiments. Based on the embodiment illustrated in FIG. 10, the information interaction device may further include a first encryption key receiving module 906 and a first encryption key transmitting module 907. The first encryption key receiving module 906 is configured to receive the first encryption key sent by the server. The first encryption key transmitting module 907 is configured to transmit the first encryption key to the wearable device via the connection such that the wearable device stores the first encryption key and the logged-in ID in an associated manner.

Alternatively or additionally, the first encryption key and the second encryption key are symmetric encryption keys.

In the embodiments, if the pair of encryption keys are symmetric encryption keys, by sending the encrypted result to the server directly, the server may determine whether the encryption key stored in the wearable device matches with the current logged-in ID based on a decryption result of the received encrypted result, such that the identity of the user may be verified.

Figure 12:
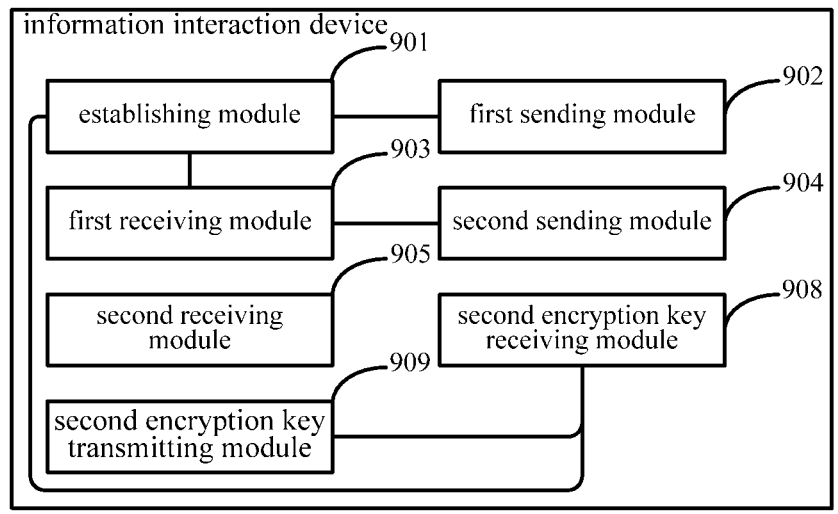
FIG. 12 is a block diagram illustrating another information interaction device based on a terminal according to one or more embodiments of the present disclosure.

As shown in FIG. 12, FIG. 12 is a block diagram illustrating another information interaction device based on a terminal according to one or more embodiments. Based on the embodiment illustrated in FIG. 10, the information interaction device may further include a second encryption key receiving module 908 and a second encryption key transmitting module 909. The second encryption key receiving module 908 is configured to receive the second encryption key sent by the wearable device. The second encryption key transmitting module 909 is configured to transmit the second encryption key to the server such that the server stores the second encryption key and the logged-in ID in an associated manner.

Alternatively or additionally, the first encryption key and the second encryption key are asymmetric keys. The first encryption key is a privacy key and the second encryption key is a public key.

In the embodiment, if the pair of encryption keys are asymmetric encryption keys, by sending the encrypted result to the server directly, the server may determine whether the encryption key stored in the wearable device matches with the current logged-in ID based on a decrypted result of the received encrypted result, such that the identity of the user may be verified.

Figure 13:
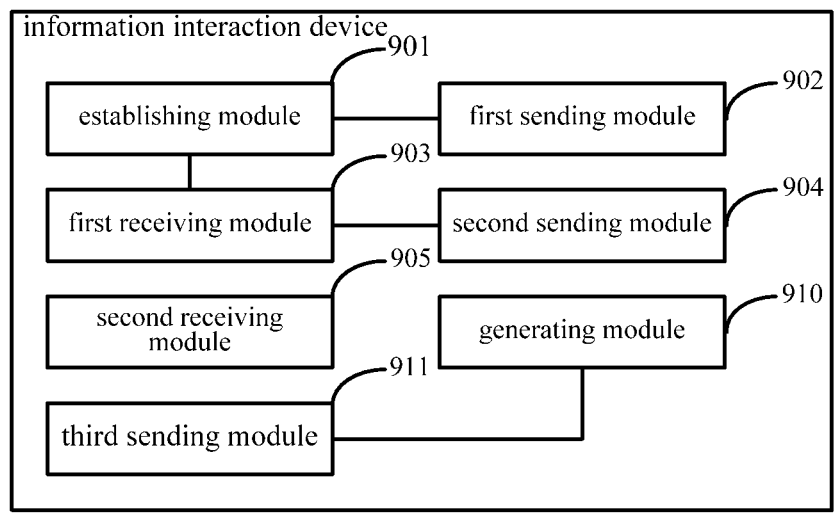
FIG. 13 is a block diagram illustrating another information interaction device based on a terminal according to one or more embodiments of the present disclosure.

As shown in FIG. 13, FIG. 13 is a block diagram illustrating another information interaction device according to one or more embodiments. Based on the embodiment illustrated in FIG. 10, the information interaction device may further include a generating module 910 and a third sending module 911. The generating module 910 is configured to generate a first verifying factor corresponding to the information to be interacted with a predetermined algorithm. The third sending module 911 is configured to send the first verifying factor and the encrypted result in an associated manner to the server such that the server returns a message indicating that an interaction is finished if the server determines that a second verifying factor is the same as the first verifying factor, in which the second verifying factor is generated with the predetermined algorithm and corresponds to a result of the decryption operation.

In the embodiments, the server may on the one hand verify the encryption key stored in the wearable device and on the other hand check the integrity of a decrypted result of the decryption operation by generating a message-digest corresponding to the information to be interacted, such that the security of data may be improved.

It should be noted that, the generating model 910 and the third sending module 911 in the embodiment of the information interaction device illustrated in FIG. 12 may be included in the embodiments of the information interaction devices illustrated in FIGS. 9-11, which are not restricted herein.

Alternatively or additionally, in the embodiments of the information interaction devices illustrated in FIGS. 9-12, the predetermined algorithm includes a Message-Digest Generating Algorithm.

Corresponding to the information interaction methods illustrated in FIG. 1B and FIG. 4B, the present disclosure further provides an embodiment of an information interaction device.

Figure 14:
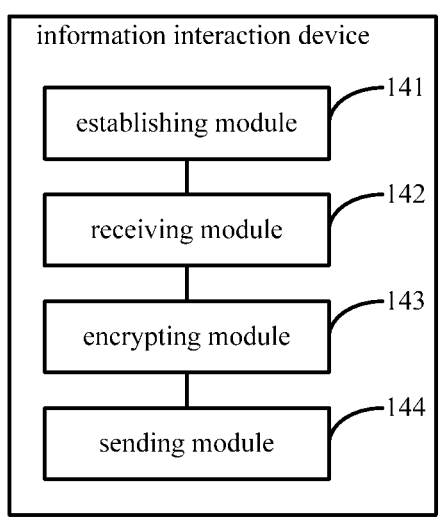
FIG. 14 is a block diagram illustrating another information interaction device based on a wearable device according to one or more embodiments of the present disclosure.

FIG. 14 is a block diagram illustrating an information interaction device based on a wearable device according to one or more embodiments. Referring to FIG. 14, the information interaction device may include an establishing module 141, a receiving module 142, an encrypting module 143 and a sending module 144. The establishing module is configured to establish a connection with a terminal. The receiving module is configured to receive information to be interacted sent by the terminal via the connection, in which the information to be interacted corresponds to a logged-in ID on the terminal. The encrypting module is configured to encrypt the information to be interacted with a pre-stored encryption key uniquely corresponding to the logged-in ID to obtain an encrypted result. The sending module is configured to send the encrypted result to the terminal via the connection such that the terminal sends the encrypted result to a server or sends a verifying factor and the information to be interacted in an associated manner to the server, in which the verifying factor is generated with a predetermined algorithm and corresponds to the encrypted result.

With respect to the devices in above embodiments, the specific manners for performing operations for individual modules therein refer to those described in detail in the embodiments regarding the methods, which are not elaborated herein again.

Embodiments of the devices correspond to embodiments of the methods. For a related content, reference is made to partial descriptions of the embodiments of the methods. The above embodiments of the devices are exemplary. Units described as separate components may be or may not be physically separated. Components shown as units may be or may not be physical units, in other words, may be integrated on one position or distributed to a plurality of network units. Some or all of the modules may be selected to achieve the objective of the solution of the embodiments according to actual requirements. Those skilled in the art may understand and implement the present disclosure without making creative efforts.

Figure 15:
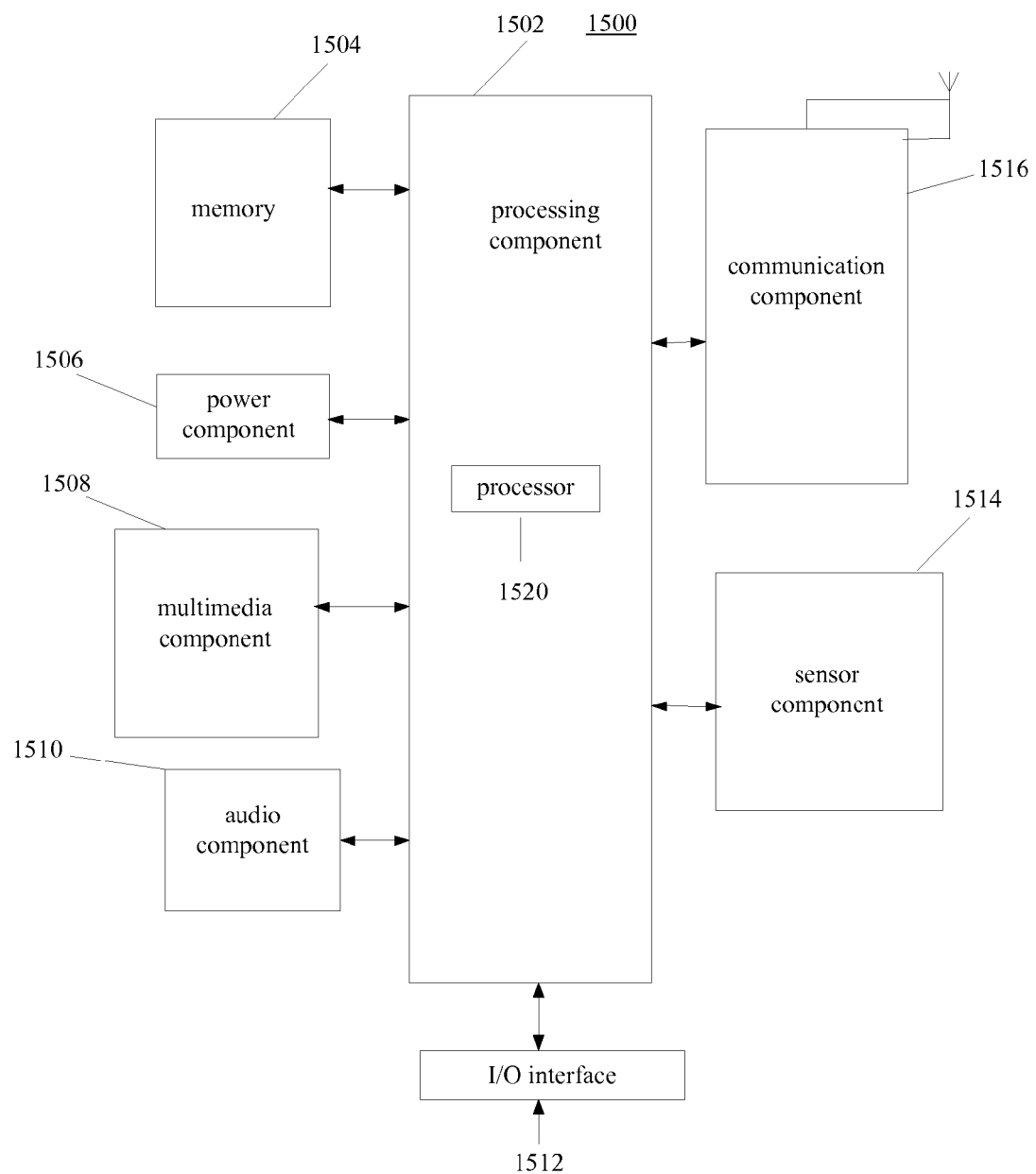
FIG. 15 is a block diagram illustrating a device configured for information interaction according to one or more embodiments of the present disclosure.

FIG. 15 is a block diagram of a device 1500 for interacting information according to one or more embodiments of the present disclosure. For example, the device 1500 may be a mobile phone, a computer, a digital broadcasting terminal, a message receiving and sending equipment, a game controller, a tablet device, a medical equipment, a fitness equipment, a PDA and so on.

Referring to FIG. 15, the device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the device 1500, such as the operations associated with display, telephone calls, data communications, camera operations, and recording operations. The processing component 1502 may include one or more hardware processors 1520 to execute instructions so as to perform all or part of the steps in the above described methods based on the terminal or methods based on the wearable device. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the device 1500. Examples of such data include instructions for any applications or methods operated on the device 1500, contact data, phonebook data, messages, pictures, videos, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The multimedia component 1508 includes a screen providing an output interface between the device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1508 includes a front camera and/or a rear camera. The front camera and/or the rear camera may receive external multimedia data while the device 1500 is in an operation mode, such as a photographing mode or a video mode. Each of the front camera and the rear camera may be a fixed optical lens system, or have focus and optical zoom capability.

The audio component 1510 is configured to output and/or input an audio signal. For example, the audio component 1510 includes a microphone ("MIC") configured to receive an external audio signal when the device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and a peripheral interface module, such as a keyboard, a click wheel, a button, and the like. The button may include, but are not limited to, a home button, a volume button, a starting button, and a locking button.

The sensor component 1514 includes one or more sensors to provide status assessments of various aspects of the device 1500. For instance, the sensor component 1514 may detect an on/off status of the device 1500, relative position of a component (e.g., the display and the keypad) of the device 1500, a change in position of the device 1500 or a component of the device 1500, a presence or absence of user contact with the device 1500, an orientation or an acceleration/deceleration of the device 1500, and a change in temperature of the device 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate wired or wireless communication between the device 1500 and other devices. The device 1500 can access a wireless network based on a communication standard, such as a WIFI network, a 2G network, or a 3G network, 4G network, or a combination thereof. In one embodiment, the communication component 1516 receives a broadcast signal or broadcast associated information from an external broadcast management system via a broadcast channel. In one embodiment, the communication component 1516 further includes a near field communication (NFC) module to facilitate short-range communications. For example, the NFC module may be implemented based on a technology such as a radio frequency identification (RFID) technology, an infrared data association (IrDA) technology, an ultra-wideband (UWB) technology, a Bluetooth (BT) technology, and other technologies.

In embodiments, the device 1500 may be implemented with at least one device selected from a group consisting of an application specific integrated circuit (ASIC), a digital signal processor (DSP), a digital signal processing device (DSPD), a programmable logic device (PLD), a field programmable gate arrays (FPGA), a controller, a micro-controller, a microprocessor, or other electronic components, for performing the above described methods according to embodiments of the present disclosure.

In embodiments, there is also provided a non-transitory computer-readable storage medium including instructions, such as the memory 1504 including instructions, and the instructions are executable by the hardware processor 1520 of the device 1500, for performing the above-described methods. For example, the non-transitory computer-readable storage medium may be a ROM, a random access memory (RAM), a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information interaction method, comprising:
    establishing, by an electronic device, a connection with a wearable device;
    sending, by the electronic device, information at least partially related to a logged-in identification (ID) to the wearable device via the connection, wherein the logged-in ID is a registered user ID for logging on the electronic device;
    receiving, by the electronic device, a first encrypted result from the wearable device, wherein the first encrypted result is obtained by encrypting the information by the wearable device with a pre-stored encryption key uniquely corresponding to the logged-in ID being the registered user ID for logging on the electronic device;
    generating, by the electronic device, a first verifying factor corresponding to the first encrypted result with a predetermined algorithm;
    sending, by the electronic device, the information and the first verifying factor in an associated manner to a server; and
    receiving, by the electronic device, a message indicating that an interaction is finished, wherein the message is sent if the server determines that a second verifying factor matches the first verifying factor, wherein the second verifying factor is generated with the predetermined algorithm and corresponds to a second encrypted result, wherein the second encrypted result is obtained by encrypting the information by the server with the pre-stored encryption key.

2. The information interaction method according to claim 1, further comprising:
    receiving the pre-stored encryption key sent by the wearable device; and
    sending the pre-stored encryption key to the server such that the server stores the pre-stored encryption key and the logged-in ID in an associated manner.

3. The information interaction method according to claim 1, further comprising:
    receiving the pre-stored encryption key sent by the server; and
    transmitting the pre-stored encryption key to the wearable device via the connection such that the wearable device stores the pre-stored encryption key and the logged-in ID in an associated manner.

4. An information interaction method, comprising:
    establishing, by an electronic device, a connection with a wearable device;
    sending, by the electronic device, information at least partially related to a logged-in identification (ID) to the wearable device via the connection, wherein the logged-in ID is a registered user ID for logging on the electronic device;
    receiving, by the electronic device, an encrypted result returned by the wearable device, wherein the encrypted result is obtained by encrypting the information by the wearable device with a first encryption key corresponding to the logged-in ID being the registered user ID for logging on the electronic device;
    generating, by the electronic device, a first verifying factor corresponding to the information with a predetermined algorithm;
    sending, by the electronic device, the first verifying factor and the encrypted result in an associated manner to a server; and
    receiving, by the electronic device, a message indicating that an interaction is finished, wherein the message is sent after a decryption operation on the encrypted result is performed by the server using a second encryption key matching with the first encryption key and if the server determines that a second verifying factor matches the first verifying factor, wherein the second verifying factor is generated with the predetermined algorithm and corresponds to a result of the decryption operation.

5. The information interaction method according to claim 4, further comprising:
    receiving the first encryption key sent by the server; and
    transmitting the first encryption key to the wearable device via the connection such that the wearable device stores the first encryption key and the logged-in ID in an associated manner.

6. The information interaction method according to claim 4, further comprising:
    receiving the second encryption key sent by the wearable device; and
    transmitting the second encryption key to the server such that the server stores the second encryption key and the logged-in ID in an associated manner.

7. An information interaction device, comprising:
    a processor;
    a memory configured to store instructions executed by the processor;
    wherein the processor is configured to:
        establish a connection with a wearable device;
        send information to be interacted corresponding to a logged-in identification (ID) to the wearable device via the connection, wherein the logged-in ID is a registered user ID for logging on the electronic device;

receive a first encrypted result returned by the wearable device, wherein the first encrypted result is obtained by encrypting the information to be interacted by the wearable device with a pre-stored encryption key corresponding to the logged-in ID being the registered user ID for logging on the electronic device;

generate a first verifying factor corresponding to the first encrypted result with a predetermined algorithm;

send the information to be interacted and the first verifying factor in an associated manner to a server; and receive a message indicating that an interaction is finished, wherein the message is sent if the server determines that a second verifying factor matches the first verifying factor, wherein the second verifying factor is generated with the predetermined algorithm and corresponds to a second encrypted result, wherein the second encrypted result is obtained by encrypting the information to be interacted by the server with the pre-stored encryption key.

8. The information interaction device according to claim 7, wherein the processor is further configured to:
receive the pre-stored encryption key sent by the wearable device; and
send the pre-stored encryption key to the server such that the server stores the pre-stored encryption key and the logged-in ID in an associated manner.

9. The information interaction device according to claim 7, wherein the processor is further configured to:
receive the pre-stored encryption key sent by the server; and
transmit the pre-stored encryption key to the wearable device via the connection such that the wearable device stores the pre-stored encryption key and the logged-in ID in an associated manner.

10. An information interaction device, comprising:
a processor;
a memory configured to store instructions executed by the processor;
wherein the processor is configured to:
establish a connection with a wearable device;
send information to be interacted corresponding to a logged-in identification (ID) to the wearable device via the connection, wherein the logged-in ID is a registered user ID for logging on the electronic device;

receive an encrypted result returned by the wearable device, wherein the encrypted result is obtained by encrypting the information to be interacted by the wearable device with a first encryption key corresponding to the logged-in ID being the registered user ID for logging on the electronic device;

generate a first verifying factor corresponding to the information to be interacted with a predetermined algorithm;

send the first verifying factor and the encrypted result in an associated manner to a server; and receive a message indicating that an interaction is finished, wherein the message is sent after a decryption operation on the encrypted result is performed by the server using a second encryption key matching with the first encryption key and if the server determines that a second verifying factor matches the first verifying factor, wherein the second verifying factor is generated with the predetermined algorithm and corresponds to a result of the decryption operation.

11. The information interaction device according to claim 10, wherein the processor is further configured to:
receive the first encryption key sent by the server; and
transmit the first encryption key to the wearable device via the connection such that the wearable device stores the first encryption key and the logged-in ID in an associated manner.

12. The information interaction device according to claim 10, wherein the processor is further configured to:
receive the second encryption key sent by the wearable device; and
transmit the second encryption key to the server such that the server stores the second encryption key and the logged-in ID in an associated manner.

13. The information interaction device according to claim 10, wherein at least one of the first and second encryption keys is preset at least partially based on an identification number of the wearable device.

14. The information interaction device according to claim 10, wherein at least one of the first and second encryption keys is preset at least partially based on an identification number of a wireless router communicating with both the wearable device and the information interaction device.

* * * * *